Aug. 21, 1956 V. J. COOPER 2,760,082
MULTIPLE UNIT D.C. POWER SUPPLY SYSTEMS
Filed June 26, 1951
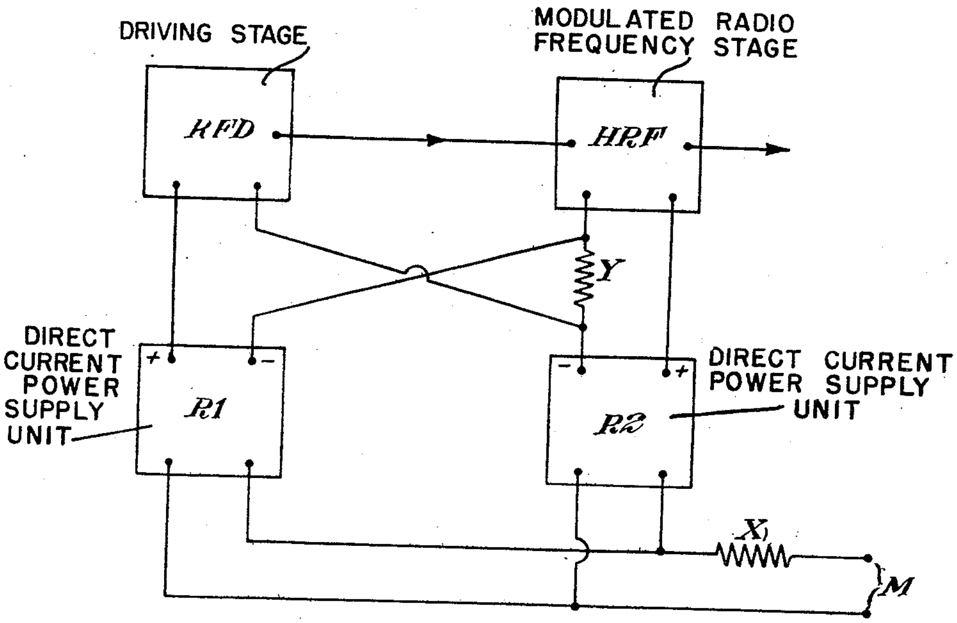
Inventor:
Victor James Cooper;
By his attorneys,
Baldwin & Wight United States Patent Office 2,760,082

Patented Aug. 21, 1956

2,760,082

MULTIPLE UNIT D. C. POWER SUPPLY SYSTEMS

Victor James Cooper, Writtle, England, assignor to Marconi's Wireless Telegraph Company Limited, London, England, a company of Great Britain Application June 26, 1951, Serial No. 233,602

Claims priority, application Great Britain July 12, 1950

1 Claim. (Cl. 307—43)

This invention relates to multiple unit D. C. power supply systems suitable for use for modulated radio transmitters and similar apparatus, that is to say, to D. C. power supply systems in which more than one rectifier or similar D. C. power supply unit is provided to supply operating high tension power to the various different parts of a radio transmitter or the like.

It is a common experience in transmitters subject to modulation by very low frequencies and/or D. C. modulating components and wherein different rectifiers fed through a common impedance from an A. C. source are employed to supply operating high tension potentials to the different parts of the transmitter, for large current excursions due to the high power stages of the transmitter to cause demodulation effects in the smaller power stages owing to voltage drop in the said common impedance. This type of action is particularly prone to occur in television transmitters (though it occurs in other cases too) where it is usual to provide moving coil voltage regulators in the common connection from the A. C. mains to the rectifier units in order to reduce the undesired effects of mains voltage variations. Such regulators, of course, constitute impedances common to all the rectifier unit supplies. If, in such a case, modulation causes a large current excursion in the high tension feed current of, say, the final high power stage of a modulated television transmitter, and this produces a current change of I amperes in the common impedance, the voltage drop across said impedance will, of course, change by I times the value of said impedance and this change will affect all the other rectifier units, for other parts of the transmitter, which are fed through the said common impedance.

Hitherto electronic voltage stabilizers have frequently been employed to overcome this defect but such stabilizers are comparatively costly and complex. The present invention seeks to provide a simpler and cheaper way of overcoming the defect in question and compensating to a desired degree for voltage variations caused in the manner described across the common impedance. As will be seen later the invention also enables under-compensation or over-compensation to be obtained, if desired.

According to this invention a multiple unit D. C. power supply system having a plurality of D. C. supply units fed through a common impedance from an energizing source is provided with an additional common impedance which is included in the common D. C. return path of said units so as to compensate, to a desired degree, for voltage variations caused by current variations in the first mentioned common impedance.

The invention is illustrated in the accompanying drawing which shows in block diagram form one typical embodiment of the said invention as applied to a television transmitter having a R. F. driving stage feeding into a high power modulated R. F. stage.

Referring to the drawing a radio frequency driving stage is represented at RFD and a high power modulated radio frequency stage at HRF. Since the constructions embodied in these stages are conventional and, moreover, since they may be of any form well known to those skilled in the art as ordinarily employed in radio transmitters, they are represented as rectangles. R1, R2 are direct current supply units, also well known per se, of the rectifier type for converting input alternating current energy from a power main or other supply connected at M into direct current high tension supply for the stages RFD and HRF. Since the invention is not concerned with the internal structure of these units which may be, as stated, of conventional form, they too are represented by rectangles. The unit R1 is of small power capacity and delivers H. T. to the driving stage RFD and the unit R2 is of high power capacity and delivers HT to the RF stage HRF. These units whose alternating current input circuit terminals are indicated at AC1, AC2 and whose direct current output circuit terminals are indicated at DC1, DC2 are fed in parallel on the A. C. side from A. C. mains (connected at M) through leads, one of which includes an impedance X in the common alternating current supply circuit to both rectifier units. The impedance X, may be, for example, a voltage regulator of well known form and as commonly employed in the alternating current feed circuits of direct current supply units. The positive leads from the rectifier units to the stages they respectively feed are made directly as in the normal way, but in accordance with this invention the negative, or return D. C. lead to the high power unit R2 has inserted therein a second common impedance Y. The negative or return D. C. lead to the lower power unit R1 also includes this second common impedance Y which is connected therein by crossed-over connections from the ends of said second common impedance as shown. Accordingly the invention provides the important advantage that undesired demodulation effects at the R. F. driving stage due to voltage drop variations across the common impedance X on the A. C. side will be compensated by the accompanying voltage drop variations produced across the common impedance Y on the D. C. side and by suitably choosing the value of this common impedance, more or less exact compensation, or under-compensation or over-compensation may be achieved as may be desired.

In the embodiment above described and illustrated a single phase A. C. supply has been (for simplicity) assumed, but obviously the invention may be extended to multiple-phase supplies in a manner which needs no further description.

In accordance with well known normal practice each rectifier unit R1, R2 will generally incorporate a constant impedance filter network having a considerable number of smoothing filter sections to eliminate undesired "ripple" or mains frequency and harmonic frequency components present in the direct current outputs from the rectifiers in the direct current supply units. In such a case the second common impedance Y may, as a general rule, be conveniently and economically constituted by the already provided lowest frequency section of the appropriate constant impedance filter network, for the nature of the common impedance on the A. C. side is usually such that the defect which the invention seeks to compensate for is unlikely to arise except at the lower frequencies.

A change in current in the load HRF produces a voltage drop across an impedance X due to the regulation of the latter. Consequently the driving stage RFD has less H. T. voltage in virtue of this voltage drop in X. One result of this is that at instants of high output from the stage HRF the maximum load will be placed on the rectifier R2 and accordingly the maximum voltage drop will occur across X. Thus at the instant when it is particularly important that the driver stage at RFD shall have its H. T. supplies maintained the maximum drop in voltage occurs in the A. C. supply to the rectifier R1 supplying the power circuits of the driving stage RFD. To compensate for this change in H. T. supply to driving stage RFD, a voltage is injected into the H. T. circuit of RFD by means of an impedance Y which is also connected in the H. T. supply to the driver stage HRF. The arrangement is such that the voltage developed across Y is equal and opposite in the two H. T. supply circuits. Thus the voltage drop occasioned by the increase in load at HRF is compensated in Y by an equal and opposite effect due to the passage therethrough in opposite direction of current from the driver stage RFD.

Although, for simplicity, the invention has been particularly described as applied to a case where there are only two D. C. supply units, it is obviously applicable in the same manner to any number of units.

I claim:

In combination in a direct current power supply system fed from a single alternating current source, a plurality of rectifiers each adapted to convert alternating current voltage to direct current voltage, each of said rectifiers supplying a separate load at least one of which is variable, each rectifier having a pair of alternating current input terminals and positive and negative direct current output terminals; means connecting said input terminals in parallel with one another; connections between the parallel connected input terminals and a pair of alternating current voltage supply terminals, one of said connections including a first impedance of predetermined value; a connector between the positive terminal of one rectifier and one side of one load; a connector betwen the positive terminal of another rectifier and one side of another load; a connector between the negative terminal of said one rectifier and the other side of said one load, said connector including a second impedance of predetermined value; a connector between the negative terminal of said other rectifier and said other side of said one load; and a connector between the negative terminal of said one rectifier and the other side of said other load.

References Cited in the file of this patent

UNITED STATES PATENTS

| | | |
|---|---|---|
| 2,222,196 | Veilkomerson | Nov. 19, 1940 |
| 2,238,259 | Hagen | Apr. 15, 1941 |

FOREIGN PATENTS

| | | |
|---|---|---|
| 670,010 | Great Britain | Apr. 9, 1952 |